(12) United States Patent
Hanley et al.

(10) Patent No.: US 9,441,332 B2
(45) Date of Patent: Sep. 13, 2016

(54) CO-POLYMER SOIL SUBGRADE BINDERS

(71) Applicant: The Texas A&M University System, College Station, TX (US)

(72) Inventors: Howard J. M. Hanley, Doha (QA); Eyad A. Masad, Doha (QA); Srinath R. Iyengar, Doha (QA); Ana K. Rodriguez, Doha (QA); Hassan S. Bazzi, Doha (QA)

(73) Assignee: THE TEXAS A&M UNIVERSITY SYSTEM 3369 TAMU, College Station, TX (US)

( * ) Notice: Subject to any disclaimer, the term of this patent is extended or adjusted under 35 U.S.C. 154(b) by 187 days.

(21) Appl. No.: 14/102,071

(22) Filed: Dec. 10, 2013

(65) Prior Publication Data

US 2014/0169879 A1    Jun. 19, 2014

Related U.S. Application Data

(60) Provisional application No. 61/735,340, filed on Dec. 10, 2012.

(51) Int. Cl.
| | | |
|---|---|---|
| *E01C 3/04* | (2006.01) | |
| *C09K 17/22* | (2006.01) | |
| *C08F 220/56* | (2006.01) | |

(52) U.S. Cl.
CPC ............... *E01C 3/04* (2013.01); *C08F 220/56* (2013.01); *C09K 17/22* (2013.01); *Y10T 428/31815* (2015.04)

(58) Field of Classification Search
CPC .................................. C09K 17/22; E01C 3/04
See application file for complete search history.

(56) References Cited

U.S. PATENT DOCUMENTS

2014/0369749 A1* 12/2014 Friedman ............... C08K 11/00
404/72

FOREIGN PATENT DOCUMENTS

| CN | 201713743 U | * | 1/2011 |
| JP | H 1180728 | * | 3/1999 |
| JP | 2003334597 A | * | 11/2003 |

OTHER PUBLICATIONS

Machine translation of CN 201713743 U, 2011.*
Machine translation of JPH 1180728, 1999.*
Machine translation of JP2003334597 A, 2003.*
ASTM (American Society for Testing and Materials) Data Series. (2007) "D1633—Standard test methods for compressive strength of molded soil-cement cylinders," *American Society for Testing and Materials* West Conshohocken, PA, USA.
ASTM (American Society for Testing and Materials) Data Series. (2008) "D4609—Standard guide for evaluating effectiveness of admixtures for soil stabilization," *American Society for Testing and Materials* West Conshohocken, PA USA.
ASTM (American Society for Testing and Materials) Data Series. (2011) "D2487—Standard Practice for Classification of Soils for Engineering Purposes (Unified Soil Classification System)," *American Society for Testing and Materials* West Conshohocken, PA, USA.
Hanley, H. J. M. et al. (1997) "Surfactant Adsorption on a Clay Mineral: Application of Radiation Scattering," *Langmuir* 13, 5276-5282.
Iyengar, S. et al. (2012) "Pavement Subgrade Stabilization Using Polymers: Characterization and Performance," *Journal of Materials in Civil Engineering* 0(E-published Aug. 25, 2012).
Liard, L. A. (1997) "Bonding between polyacrylamide and clay mineral surfaces," *Soil Science* 162(11), 826-832.
Matyjaszewski, K. (2001) "Macromolecular engineering by controlled/living ionic and radical polymerizations," *Macromolecular Symposia* 174(1), 51-68.
Miller, W. P. et al. (1998) "Aggregate stabilization in kaolinitic soils by low rates of anionic polyacrylamide," *Soil Use Management* 14(2), 101-105.
Moustafa, A. B. et al. (1981) "Soil stabilization by polymeric materials," *Macromolecular Materials and Engineering* 97(1), 1-12.
Newman, K. et al. (2004) Emulsion polymers for soil stabilization soils, in *2004 FAA Worldwide Airport Technology Transfer Conference*, Atlantic City, New Jersey, USA.
Patrizi, M. L. et al. (2009) "Synthesis and association properties of thermoresponsive and permanently cationic charged block copolymers," *Polymer* 50(2), 467-474.
Rauch, A., F. et al. (2002) "Measured effects of liquid soil stabilizers on engineering properties of clay," *Transportation Research Record* 1787, 33-41.
Seybold, C. (1994) "Polyacrylamide review: soil conditioning and environmental fate," *Communications in Soil Science and Plant Analysis* 25(11/12), 2171-2185.
Tingle, J. S. et al. (2003) Stabilization of clay soils with non-traditional additives, in *Proceedings of the Eighth International Conference on Low-Volume Roads*, pp. 72-84, Transportation Research Board, Reno, NV, USA.
Wallace, A. et al. (1986) "Mechanisms involved in soil conditioning by polymers," *Soil Science* 141(5), 381-386.
AASHTO, (2008) "T265—Laboratory determination of moisture content of soils," American Association of State Highway and Transportation Officials Washington, DC, USA.
Aashto, (2009) "T99—Moisture-density relations of soils, using a 5.5-lb (2.5-kg) rammer and a 12-in. (305-mm) drop [Method C]," American Association of State Highway and Transportation Officials Washington, DC, USA.
Aly, S. M. and Miller, W. P., (1995) "Evaluation of two polymers for soil stabilization and wind erosion control," *Egypt. J. Soil Sci.* 35(1), 71-83.

(Continued)

*Primary Examiner* — Wenwen Cai
(74) *Attorney, Agent, or Firm* — Richard C. itman

(57) ABSTRACT

This invention is in the field of road construction as it relates to improving the quality and lifetime of asphalt roads and pavement surfaces. The invention relates to methods and compositions utilizing co-polymers in combination with soil to form improved subgrade soil binder compositions for supporting asphalt roads and pavement surfaces.

2 Claims, 8 Drawing Sheets

(56) References Cited

OTHER PUBLICATIONS

ASTM (American Society for Testing and Materials) Data Series, (2007) "D1633—Standard test methods for compressive strength of molded soil-cement cylinders," American Society for Testing and Materials West Conshohocken, PA, USA.

ASTM (American Society for Testing and Materials) Data Series, (2008) "D4609—Standard guide for evaluation effectiveness of admixtures for soil stabilization," Amerian Society for Testing and Materials West Conshohocken, PA USA.

ASTM (American Society for Testing and Materials) Data Series, (2011) "D2487—Standard Practice for Classification of Soils for Engineering Purposes (Unified Soil Classification System),"", American Society for Testing and Materials West Conshohocken, PA, USA.

Hanley, H. J. M. et al., (1997) "Surfactant Adsorption on a Clay Mineral: Application of Radiation Scattering," Langmuir 13, 5276-5282.

Heffer, A. W. et al., (2005) "A synthesis of theories and mechanisms of bitumen-aggregate adhesion including recent advances in quantifying the effects of water," Journal of the Association of Asphalt Paving Technology 74, 139-195.

Liard, L. A., (1997) "Bonding between polyacrylamide and clay mineral surfaces," Soild Sci 162(11), 826-832.

Matyjaszewski, K., (2001) "Macromolecular engineering by controlled/living ionic and radical polymerizations," Macromol. Symp. 174(1), 51-68.

Miller, W. P. et al., (1998) "Aggregate stabilization in kaolinitic soils by low rates of anionic polyacrylamide," Soil Use Management 14(2), 101-105.

Moustafa, A. B. et al., (1981) "Soil stabilization by polymeric materials," Macromol. Mater. Eng. 97(1), 1-12.

Newman, K. and Tingle, J. S., (2004) "Emulsion polymers for soil stabilization soils," in 2004 FAA Worldwide Airport Technology Transfer Conference, Atlantic City, New Jersey, USA.

Patrizi, M. L. et al., (2009) "Synthesis and association properties of thermoresponsive and permanently cationic charged block copolymers," Polymer 50(2), 467-474.

Rauch, A., F. et al., (2002) "Measured effects of liquid soil stabilizers on engineering properties of clay," Transportation Research Record 1787, 33-41.

Seybold, C., (1994) "Polyacrylamide review: soil conditioning and environmental fate," Commun. Soil Sci. Plant Anal. 25(11/12), 2171-2185.

Thompson, M. R., (1986) "Mechanistic design concepts for stabilized base pavements," in UILU-ENG-86-2008, , University of Illinois, Urbana, IL, USA.

Tingle, J. S. and Santoni, R. L., (2003) "Stabilization of clay soils with non-traditional additives," in Proceedings of the Eighth International Conference on Low-Volume Roads, pp. 72-84, Transportation Research Board, Reno, NV, USA.

Wallace, A., (1998) *Handbook of soil conditioners*, Marcel Dekker, New York, USA.

Wallace, A. et al., (1986) "Mechanisms involved in soil conditioning by polymers," Soil Sci 141(5), 381-386.

\* cited by examiner

Ampholitic TPAM wherein the relative proportional range of m, p, and q are m is at least 1/3, p = 0 to 2/3, q = 0 to Pavement structure and layer thicknesses.

In a simplified example, the polymer is mixed with the soil,
cured, and subsequently a layer of asphalt can be deposited
on the now stabilized subgrade soil mixture layer

CO-POLYMER SOIL SUBGRADE BINDERS

CROSS-REFERENCE TO RELATED APPLICATIONS

The present application claims the benefit of U.S. Provisional Patent Application No. 61/735,340, filed on Dec. 10, 2012, which is incorporated herein by reference.

FIELD OF THE INVENTION

This invention is in the field of road construction as it relates to improving the quality and lifetime of asphalt roads and pavement surfaces. The invention relates to methods and compositions utilizing co-polymers in combination with soil to form improved subgrade soil binder compositions for supporting asphalt roads and pavement surfaces.

BACKGROUND OF THE INVENTION

The performance of asphalt pavements depends crucially on the strength and stability of the supporting soil layer, referred to as the subgrade. A pavement subgrade failure can be catastrophic: extremely hazardous to traffic and extremely expensive to rectify. This is known and commercial subgrade binders are available, the most common of which are cement or polymer based. However, there is a continued need for a greener, technically sound, and commercially viable, alternative to soil stabilization that is easily adaptable to soils of various compositions. Such methods and compositions would be extremely useful in increasing the lifetime of roads and decreasing the cost of road maintenance.

SUMMARY OF THE INVENTION

This invention is in the field of road construction as it relates to improving the quality and lifetime of asphalt roads and pavement surfaces. The invention relates to methods and compositions utilizing co-polymers in combination with soil to form improved subgrade soil binder compositions for supporting asphalt roads and pavement surfaces. The present invention contemplates a different methodology for the preparing the subgrade and various compositions of said soil subgrade.

In one embodiment, the invention relates to a co-polymer soil subgrade binder of the formula:

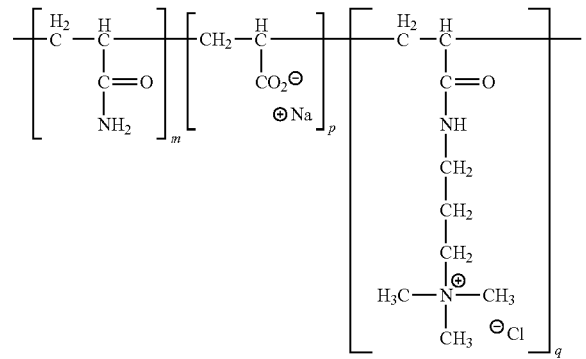

wherein the relative proportional range of m, p, and q are m is at least ⅓, p=0 to ⅔, q=0 to ⅔.

In one embodiment, the invention relates to a method of stabilizing the soil layer below asphalt-based pavements comprising; a) providing; i) a co-polymer soil subgrade binder of the formula:

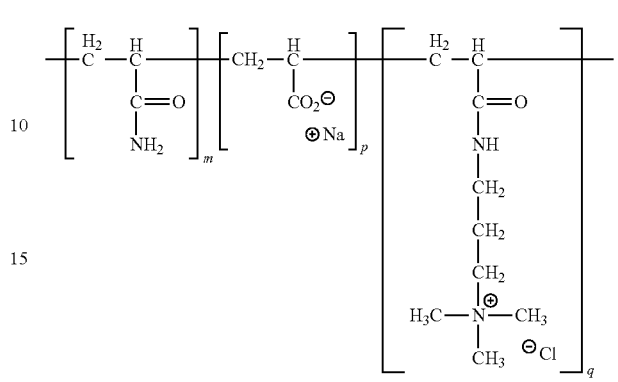

wherein the relative proportional range of m, p, and q are m is at least ⅓, p=0 to ⅔, q=0 to ⅔, ii) soil; and b) treating said soil with said co-polymer soil subgrade binder so as integrate said binder with said soil to form a mixture. In one embodiment, the method further comprises step c) molding said mixture into a desired shape. In one embodiment, the method further comprises step d) curing said mixture. In one embodiment, said curing comprises at least 1 day. In one embodiment, said curing comprises at least 7 days. In one embodiment, said curing comprises at least 28 days. In one embodiment, asphalt is applied after said curing. In one embodiment, the invention relates to said co-polymer soil subgrade binder, wherein m, p, q proportions are varied within the range to suit the composition of a candidate soil. In one embodiment, the m, p, and q proportions of the co-polymer soil subgrade binder are varied within the range to suit the anionic/cationic/neutral composition of said soil. In one embodiment, said treating soil with said co-polymer subgrade binder comprises mixing said soil with an aqueous solution containing said co-polymer. In one embodiment, said solution contains a predetermined co-polymer content estimated as percentage per dry weight of soil. In one embodiment, said polymer content estimated as percentage per dry weight of soil is between 0.1 and 10 percent.

In one embodiment, the invention relates to a mixture of soil and a polymer binder, said polymer comprising at least one monomer selected from the group comprising acrylamide, sodium acrylate, 3-acrylamido-N,N,N-trimethylpropan-1-aminium chloride, and acrylamide propyl trimethyl ammonium chloride. In one embodiment, said polymer has the structure:

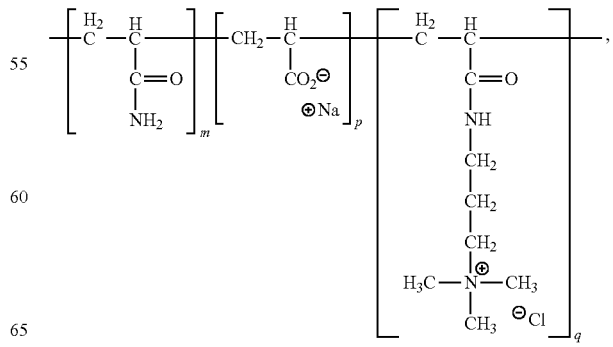

wherein the relative proportions of m, p, and q are m is at least ⅓, p=0 to ⅔, q=0 to ⅔.

In one embodiment, the invention relates to a layered composition comprising: a) a first layer containing a mixture of soil and a polymer binder, said polymer comprising at least one monomer selected from the group comprising acrylamide, sodium acrylate, 3-acrylamido-N,N,N-trimethylpropan-1-aminium chloride, and acrylamide propyl trimethyl ammonium chloride, and b) a second layer of asphalt on top of said mixture. In one embodiment, said layer containing further comprises a third layer, said third layer positioned between said first and second layers and comprising cement. In one embodiment, said cement layer comprises rebar.

The present invention contemplates a different methodology for the preparing the subgrade. In one embodiment, the invention contemplates a method of stabilizing the soil layer below asphalt-based pavements comprising; a) providing; i) a co-polymer soil subgrade binder of the formula:

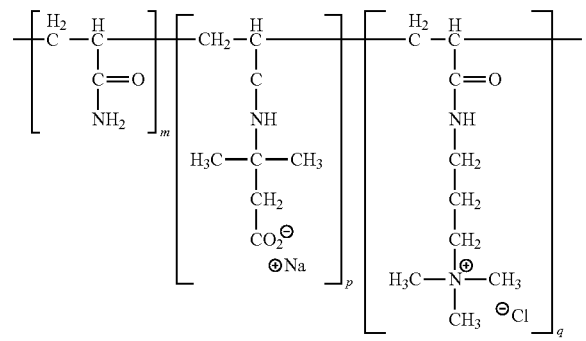

wherein the relative proportions of m, p, and q are m is at least ⅓, p=0 to ⅔, q=0 to ⅔, ii) soil; and b) treating said soil with said co-polymer soil subgrade binder so as integrate said binder with said soil to form a mixture. In one embodiment, the method further comprises step c) molding said mixture into a desired shape. In one embodiment, the method further comprises step d) curing said mixture. In one embodiment, said curing comprises at least 1 day. In one embodiment, said curing comprises at least 7 days. In one embodiment, said curing comprises at least 28 days. In one embodiment, asphalt may be applied after said curing. In one embodiment, asphalt may be applied 3 to 7 days after polymer treatment of soils. In one embodiment, the m, p, and q proportions of the co-polymer soil subgrade binder can be varied to suit the anionic/cationic/neutral composition of said soil. In one embodiment, m is ⅓ for all soils. In one embodiment, m is ⅓, p is between 0 and ⅔ and q is between 0 and ⅔. In one embodiment, such as for a very bentonite-rich soil, p is ⅔ and q is 0. In one embodiment, such as for a very limestone, or similar, soil, p is 0 and q is ⅔. In one embodiment, said treating soil with said co-polymer subgrade binder comprises mixing said soil with an aqueous solution containing said co-polymer. In one embodiment, said solution is contains a predetermined polymer content estimated as percentage per dry weight of soil. In one embodiment, said polymer content estimated as percentage per dry weight of soil is between 0 and 10 percent.

In one embodiment, the invention contemplates a co-polymer soil subgrade binder of the formula:

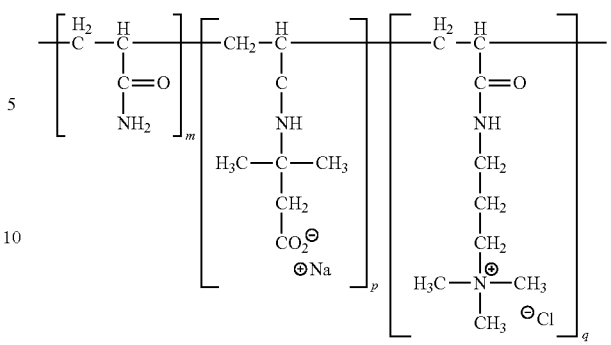

wherein the relative proportions of m, p, and q are m is at least ⅓, p=0 to ⅔, q=0 to ⅔. In one embodiment, m, p, q proportions can be varied to suit the composition of a candidate soil.

DEFINITIONS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The term "asphalt," as that term is used in the specification and/or claims, refers to several types of compositions including the sticky, black and highly viscous liquid or semi-solid present in most crude petroleums and in some natural deposits, a substance classed as a pitch, the manufactured asphalt product and the asphalt concrete composite material commonly used in construction projects such as road surfaces, airports and parking lots. It is not intended that this invention is limited to any particular type of asphalt.

The term "soil," as that term is used in the specification and/or claims, refers to the naturally occurring materials that are used for the construction of all except the surface layers of pavements (i.e., concrete and asphalt) and that are subject to classification tests, ASTM D 2487 [1], to provide a general concept of their engineering characteristics. It is not intended that this invention is limited to any particular type of soil.

The term "stabilization," as that term is used in the specification and/or claims, refers to the process of blending and mixing materials with a soil to improve certain properties of the soil. The process may include the blending of soils to achieve a desired gradation or the mixing of commercially available additives that may alter the gradation, texture or plasticity, or act as a binder for cementation of the soil. The current invention envisions the addition of polymers described herein as additives to aid in the stabilization of soils acting as soil binders.

The term "cement," as that term is used in the specification and/or claims, refers to a binder, a substance that sets and hardens independently, and can bind other materials together. Cement used in construction is characterized as hydraulic or non-hydraulic. Hydraulic cements (e.g., Portland cement) harden because of hydration, chemical reactions that occur independently of the mixture's water content; they can harden even underwater or when constantly exposed to wet weather. The chemical reaction that results when the anhydrous cement powder is mixed with water produces hydrates that are not water-soluble. Non-hydraulic cements (e.g. gypsum plaster) must be kept dry in order to retain their strength.

The term "rebar," (short for reinforcing bar), also known as reinforcing steel, reinforcement steel, rerod, a deformed bar, reo, or reo bar, as that term is used in the specification and/or claims, refers to a common steel bar, and is commonly used as a tensioning device in reinforced concrete and reinforced masonry structures holding the concrete in compression. It is usually formed from carbon steel, and is given ridges for better mechanical anchoring into the concrete.

As used herein, the term "Portland Cement" (abbreviated PC) refers to the most common type of cement in general use around the world because it is a basic ingredient of concrete, mortar, stucco and most non-specialty grout. It usually originates from limestone. It is a fine powder produced by grinding Portland cement clinker (more than 90%), a limited amount of calcium sulfate (which controls the set time) and up to 5% minor constituents as allowed by various standards.

The term "acrylamide," as that term is used in the specification and/or claims, refers to a chemical compound with the chemical formula $C_3H_5NO$ and the structure:

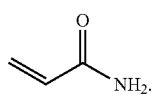

Its IUPAC name is prop-2-enamide. A polymeric version of acrylamide, termed polyacrylamide, has the structure:

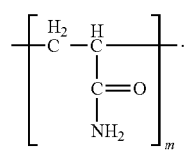

The term "sodium acrylate," as that term is used in the specification and/or claims, refers to a chemical compound with the structure:

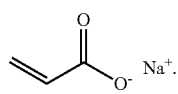

A polymeric version of sodium acrylate has the structure:

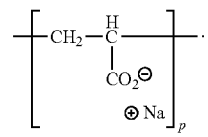

The term "acrylamide propyl trimethyl ammonium chloride," as that term is used in the specification and/or claims, refers to a chemical compound with the structure:

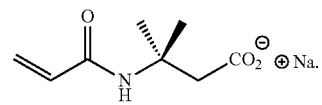

A polymeric version of acrylamide propyl trimethyl ammonium chloride, termed polyacrylamide propyl trimethyl ammonium chloride, has the structure:

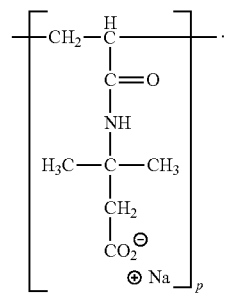

The term "3-acrylamido-N,N,N-trimethylpropan-1-aminium chloride," as that term is used in the specification and/or claims, refers to a chemical compound with the structure:

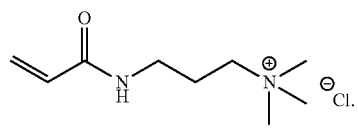

A polymeric version of 3-acrylamido-N,N,N-trimethylpropan-1-aminium chloride has the structure:

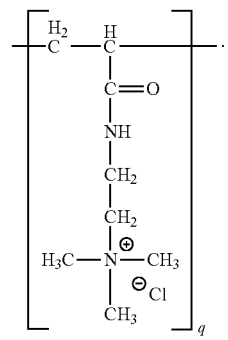

The ampholitic polyacrylamide variant, termed TPAM, has the structure:

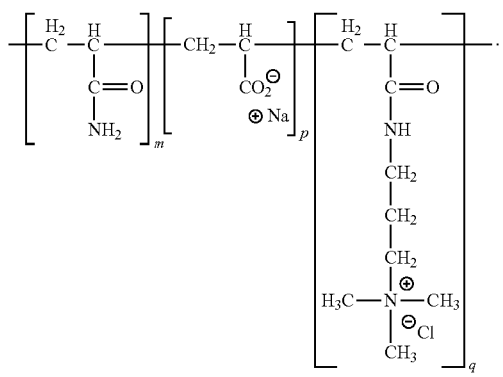

It is not intended that TPAM be limited to this particular order, the order of the monomers within may vary while the proportion of the component monomers is within a particular comparative range. In one embodiment, the TPAM polymer can be described with the following structure:

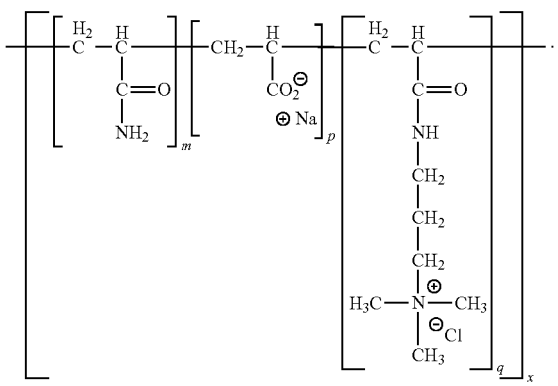

The cationic polyacrylamide variant, termed PAMTAC, has the structure:

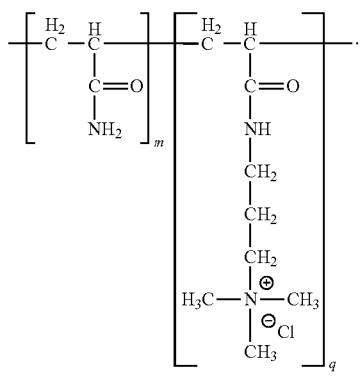

It is not intended that PAMTAC be limited to this particular order, the order of the monomers within may vary while the proportion of the component monomers is within a particular comparative range.

The anionic polyacrylamide variant, termed HPAM, has the structure:

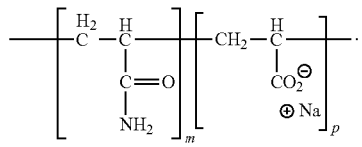

It is not intended that HPAM be limited to this particular order, the order of the monomers within may vary while the proportion of the component monomers is within a particular comparative range.

Cationic groups include, but are not limited to the polymeric version of 3-acrylamido-N,N,N-trimethylpropan-1-aminium chloride and sodium acrylate.

Anionic groups include, but are not limited to the polymeric version of acrylamide propyl trimethyl ammonium chloride.

DESCRIPTION OF THE INVENTION

Preparation for road paving generally includes compaction of the base or sub-base, which may comprise clay, gravel, crushed stone, and the like, either taken from the native materials or transported to the site. Frequently, the material includes crushed or otherwise particulated concrete and/or asphalt from the old roadway. Whether the material is primarily reclaimed from an old roadway surface material, taken from a new or old base on site, or is made from materials transported to the site, it is commonly tested for stability. The tested stability of a given mix of materials will be used as an important criterion in determining the thickness of the new pavement to be laid for a road having an expected type of traffic or load. Generally, a road or highway expected to have a great deal of heavy usage will require more concrete or asphalt than one built for relatively light or less frequent use, but an unstable base, in either case, can result in rapid damage to the pavement.

In preparing a roadbed from the materials at hand, or from imported materials, or from a mixture of them, the highway engineer may consider the bed material's permeability, elasticity, plasticity, cohesion, shearing strength, compressibility, shrinkage and swell, and frost susceptibility, among other properties. Each of these properties is well known in highway engineering and may be considered an important factor in the choice of the bed mix or any additives for it. This invention is concerned with shrinking and swelling, which is primarily a property of clays.

DETAILED DESCRIPTION OF THE INVENTION

The state of Qatar is experiencing tremendous growth in transportation infrastructure. The Public Works Authority in Qatar reported in 2010 that they intend to invest a total of $20 bn on road construction in the following five years with immediate plans for 60 major road projects through 2012 at an estimated cost of about $7 bn. The vast majority of these roads will be asphalt-based pavements. At this time, however, pavement construction does not include stabilizing the soil layer, referred to as the subgrade. Herein the data confirms that stabilizing the Qatari subgrade will improve pavement performance; in particular, it is demonstrated that polymer-based binders are attractive stabilization candidates, especially when compared with the traditionally used binder, Portland cement (PC). It is worth mentioning that, while this work was with Qatari soil, the results are relevant to the soils and weather conditions experienced throughout the Middle East and in similar climates throughout the world.

Organic polymer functional groups are known to attach to the surfaces of soil particles and subsequently bond into a polymer matrix, thus giving the subgrade a structural integrity it would not otherwise have had [2]. Conventionally, it is believed that polymers tend to react primarily with the clay fraction of the soil [3] but polymer interactions with sands and aggregates have also been reported [4]. The adsorption of cationic polymers by clays occurs through electrostatic interactions between cationic groups on the polymer and the negatively charged sites on the clay surface leading to ionic interactions in the form of charge neutralization [5, 6]. Anionic polymers tend to be repelled by the negatively charged clay surface, but adsorption can occur through the presence of polyvalent cations acting as bridges [7]. Non-ionic polymers adsorb primarily through Van der Waals forces [6] and/or hydrogen bonding [8]. In a field situation, the molecular weight and conformation of the polymer can also influence the effective adsorption, particularly if the soil surfaces are neutral or weakly charged [9].

This study builds on the work of previous authors who have approached the topic, either directly or indirectly. For example, Moustafa et al. (1981) [10] stabilized sand, silt, loam, clay, and sandy-loam soils with three types of polymeric binding materials: urea formaldehyde, phenol formaldehyde and sodium silicate. They reported that compaction of the polymer impregnated soils led to better strength and durability performance. They showed that longer curing periods and higher curing temperatures of up to 140° C. lead to improved unconfined compressive strengths for all samples and, in particular, that high content silica soils could produce a semi rigid type of pavement when stabilized at high temperatures. Aly and Miller (1995) [11] applied two commercially available acrylic polymer emulsions for the stabilization of sand. More recently, Rauch et al. (2002) [12] conducted standard laboratory soil tests to measure changes in the engineering properties of five samples of clay soils, treated individually using three different types of commercially available nontraditional liquid stabilizers (ionic, polymeric and enzyme), in an attempt to evaluate their performance as alternatives to bulk soil stabilizers, such as lime and cement. Also, a laboratory based evaluation into the stabilization of low- and high-plasticity clay soils, with twelve different types of nontraditional chemical or liquid stabilizers, including four types of proprietary polymers, was conducted by Tingle and Santoni (2003) [2].

1. Polymer Binder

If a polymer binder can specifically attach to the surfaces of the subgrade soil particles, it will give the subgrade a structural integrity it would not otherwise have had. A copolymer, designated TPAM, has been synthesized with this characteristic. As demonstrated herein, the TPAM polymer appears to perform better than a range of alternatives.

The Polymer:

TPAM is a derivative of polyacrylamide (PAM) with backbone made up of m acrylamide, p cationic and c anionic subgroups (see FIG. 1). The cationic groups enhance bonding with negatively charged subsoil elements (such as clay), while the anionic groups bond with the positively charged particle surfaces (such as limestone).

Verification.

The polymer was applied to subsoil samples from the State of Qatar—which are representative of soils from the Middle East. A sample soil was mixed with TPAM and the mix allowed to dry (cure) over a period of 28 days. Standard mechanical tests were applied after 1, 7 and 28 days respectively. Results are summarized by FIG. 3. Shown is the "Toughness" measured at these intervals compared with corresponding results from untreated soil and soil treated with a cement binder (cement is the most popular commercial binder currently available). "Toughness" is a measure of the ability of subsoil to withstand a load, and the ability of the subsoil to flex without rupture. It is clear that TPAM is a competitive, even superior, binder to cement. Further, it has been shown that TPAM gives results superior to those from typical polymer alternatives currently on the market.

TPAM is very adaptable in that the m, p, q proportions of the TPAM chain (FIG. 1) can be varied to suit the anionic/cationic/neutral composition of a candidate soil. In one embodiment the relative proportions of m, p, and q are m is at least $1/3$, $p=0$ to $2/3$, $q=0$ to $2/3$. In one embodiment, the relative m, p, and q proportions of the co-polymer soil subgrade binder can be varied to suit the anionic/cationic/neutral composition of said soil. In one embodiment, m is $1/3$ for all soils. In one embodiment, m is $1/3$, p is between 0 and $2/3$ and q is between 0 and $2/3$. In one embodiment, such as for a very bentonite-rich soil, p is $2/3$ and q is 0. In one embodiment, such as for a very limestone, or similar, soil, p is 0 and q is $2/3$. Embodiments of the TPAM are not limited to strictly the order of polymers show in FIG. 1. The important characteristic is the mpq relative proportional range.

2. PAM Vs. The Variants of PAM Described Herein

The polymer stabilizers have been compared with PAM (polyacrylamide). As described previously, three variants of polyacrylamide (PAM) were synthesized, designated PAMTAC (cationic), HPAM (anionic), and TPAM (ampholitic), respectively, and tested as pavement stabilizer with respect to natural Qatar subgrade soil.

FIG. 4 depicts the variations in toughness of untreated and treated subgrade soil samples at different curing ages. In the previous section, a strong argument was made that the parameter "Toughness" was a realistic measure to judge the efficiency of a pavement stabilizer. This conclusion has been justified by the publication of an article on road stabilization reported in the referred Journal—J. Mat. Civil Eng [13]. Based on the toughness of the subgrade samples stabilized employing 2.0% PAM vs. 2.0% TPAM in it can be clearly inferred that ionic bonding offered by TPAM enhances the efficiency of subgrade stabilization in contrast to the non-ionic PAM binder.

Herein, it has been further shown that the novel polymers give superior binding performance in comparison with the standard binder, Cement. FIG. 5 and FIG. 6 show the comparison with respect to the parameter, the Unconfined Compressive Strength (UCS), and the Toughness.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

DESCRIPTION OF THE FIGURES

The accompanying figures, which are incorporated into and form a part of the specification, illustrate several embodiments of the present invention and, together with the description, serve to explain the principles of the invention.

The figures are only for the purpose of illustrating a preferred embodiment of the invention and are not to be construed as limiting the invention.

Table 1 shows factors used in the analysis of the asphalt pavement performance.

Table 2 shows gradations of asphalt mixtures.

EXPERIMENTAL PROCEDURES

Synthesis of the Ampholitic Terpolymer:
(acrylamide-co-sodium
acrylate-co-(3-acrylamidopropyl)trimethylammonium
chloride), Designated TPAM The synthesis is based on the standard atom transfer radical polymerization (ATRP) procedure (Matyjaszewski, 2001 [14] and Patrizi et. al., 2009 [15]). Specifically, an aqueous solution of acrylamide (AM) was co-polymerized with (3-acrylamidopropyl)-trimethylammonium chloride (AMTAC) at a given AM/AMTAC ratio with methyl-2-chloropropionate as the initiator and a tris-(2-aminoethyl) amine-CuCl complex as the ATRP catalyst. The product is an AM-AMTAC co-polymer with a given concentration of cationic moduli. This co-polymer is then subjected to hydrolysis with NaOH solution under controlled conditions to yield a given concentration of the anionic moduli.

Figure 1:
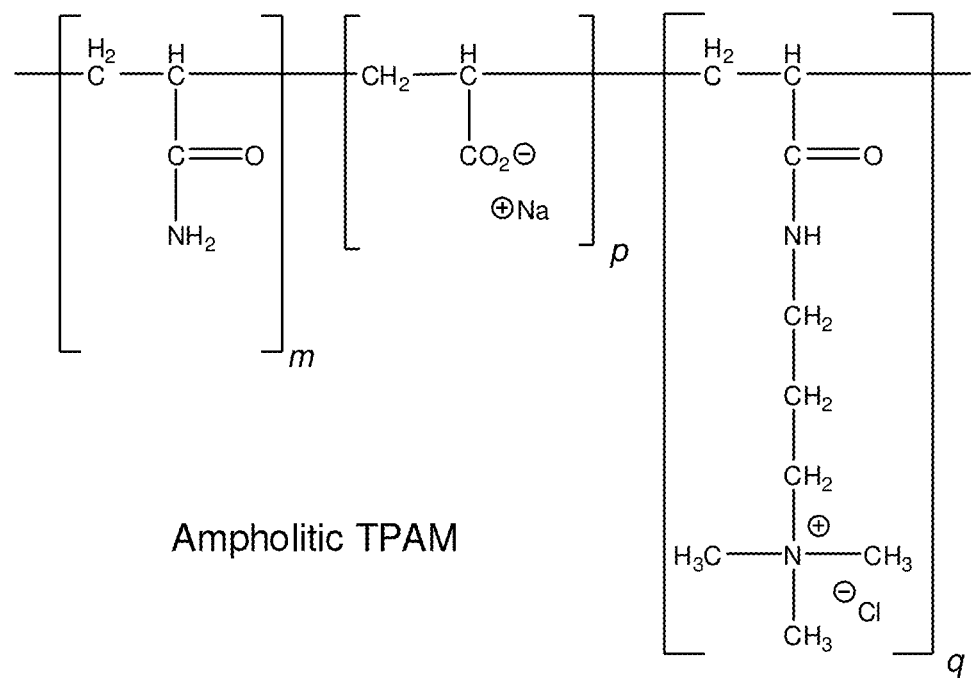
FIG. 1 shows one embodiment of the ampholitic TPAM structure.
Figure 2:
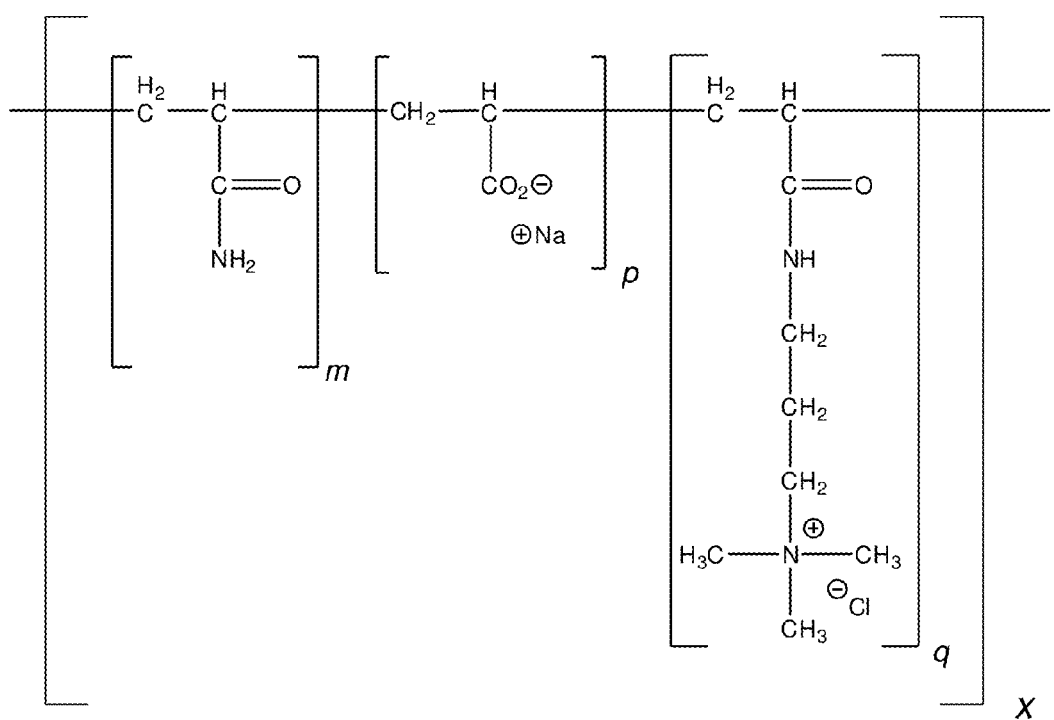
FIG. 2 shows another embodiment of the polymer of the current invention.
Figure 3:
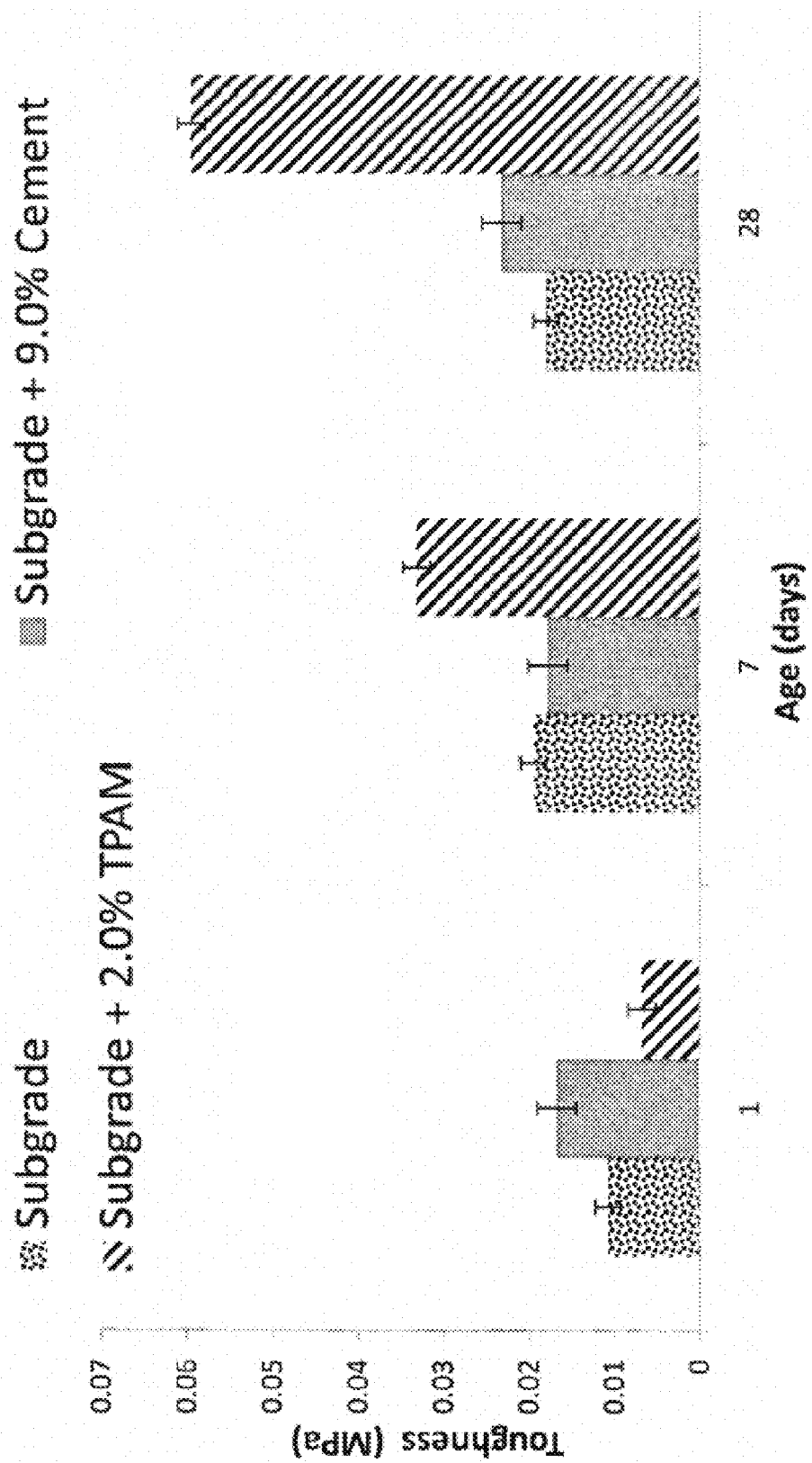
FIG. 3 shows the toughness of the soil subgrade, the subgrade treated with 9.0% cement, and the subgrade treated with 2.0% TPAM: results after 1, 7, and 28 days of curing.
Figure 4:
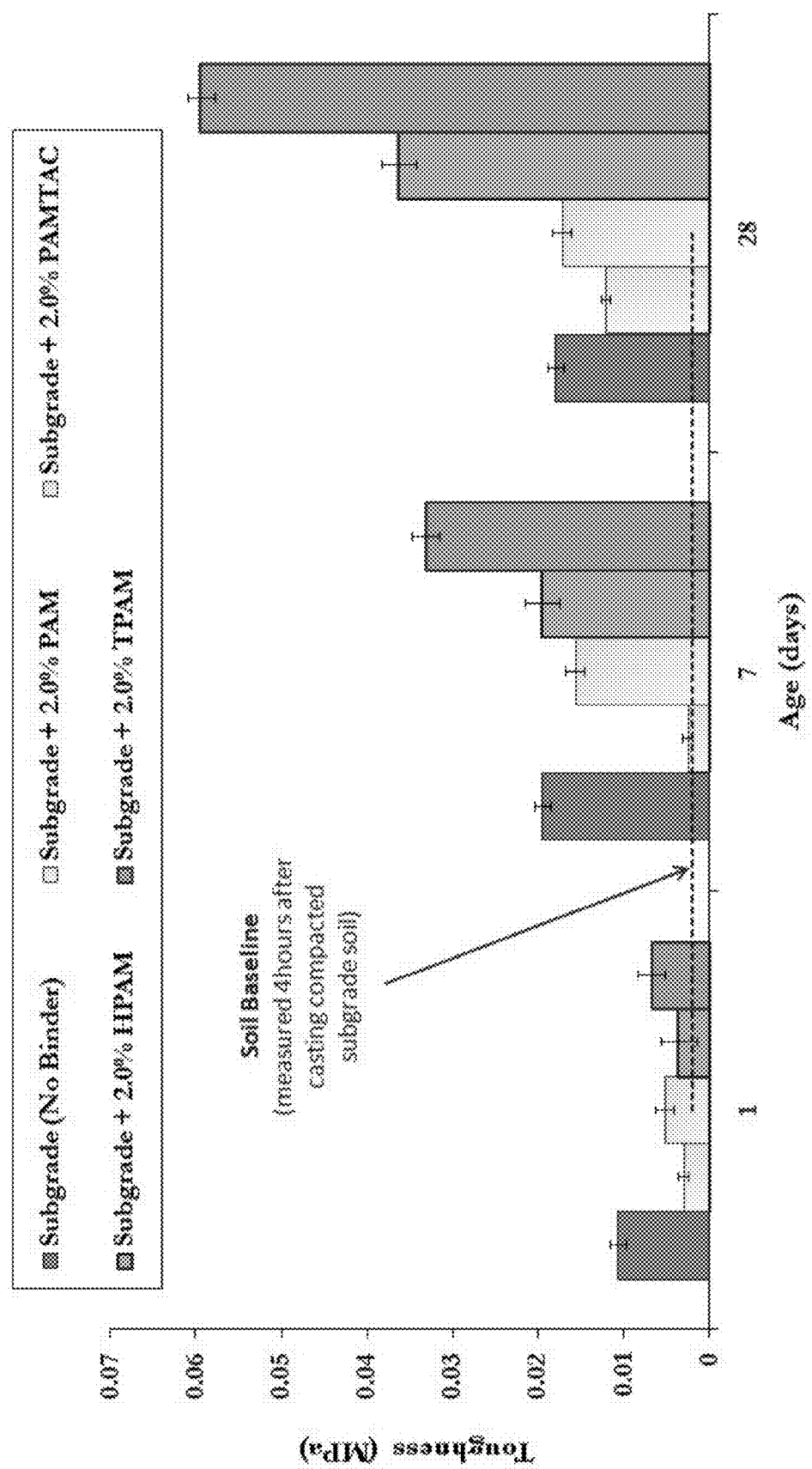
FIG. 4 shows the variation of toughness a at different curing ages for representative Qatar subgrade soil treated with and without analytical PAM and it synthesized variants.
Figure 5:
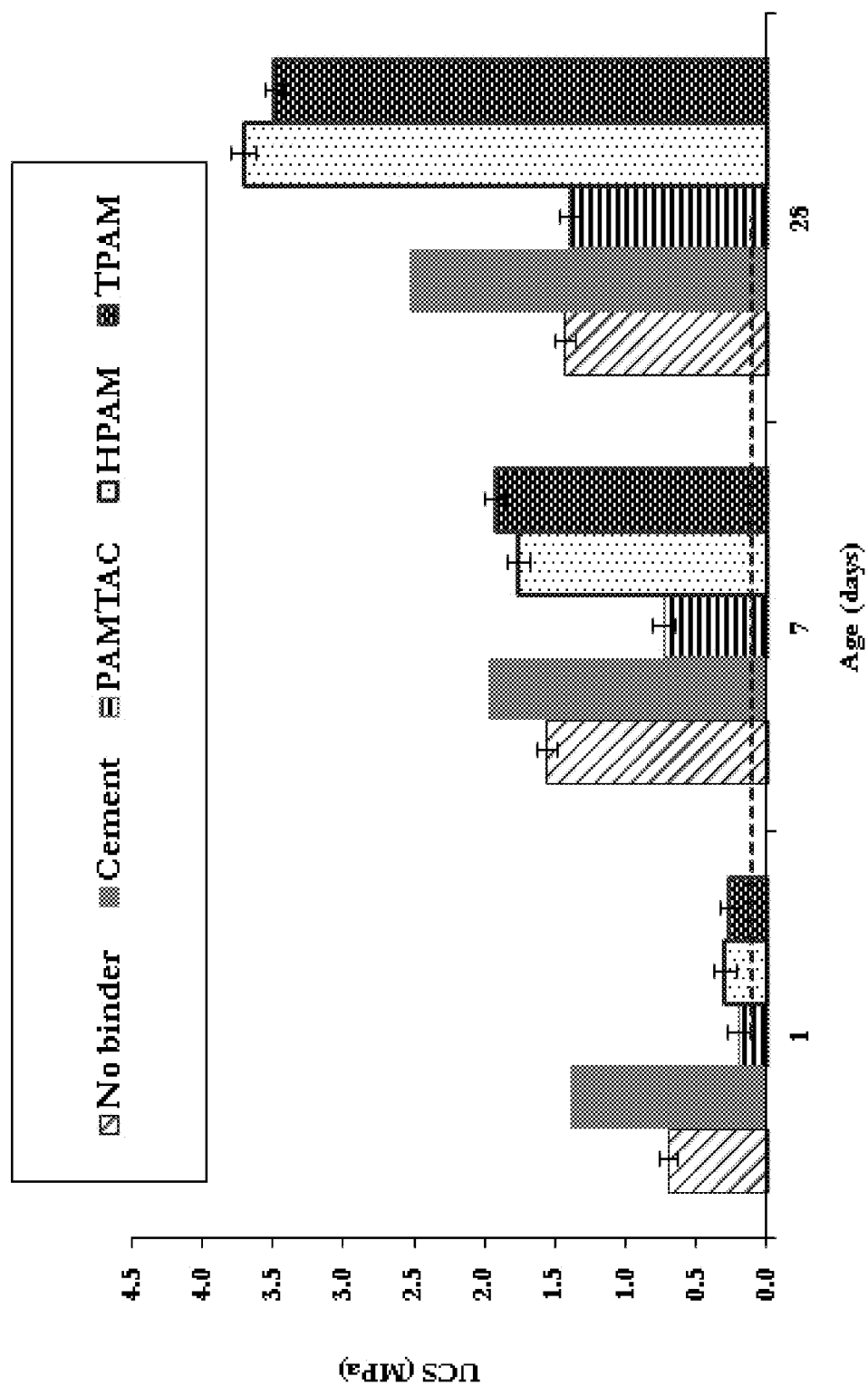
FIG. 5 shows the unconfined compressive strength (UCS) of the soil and the soil treated with Portland Cement and the polymers variants after 1, 7, and 28 days of curing.
Figure 6:
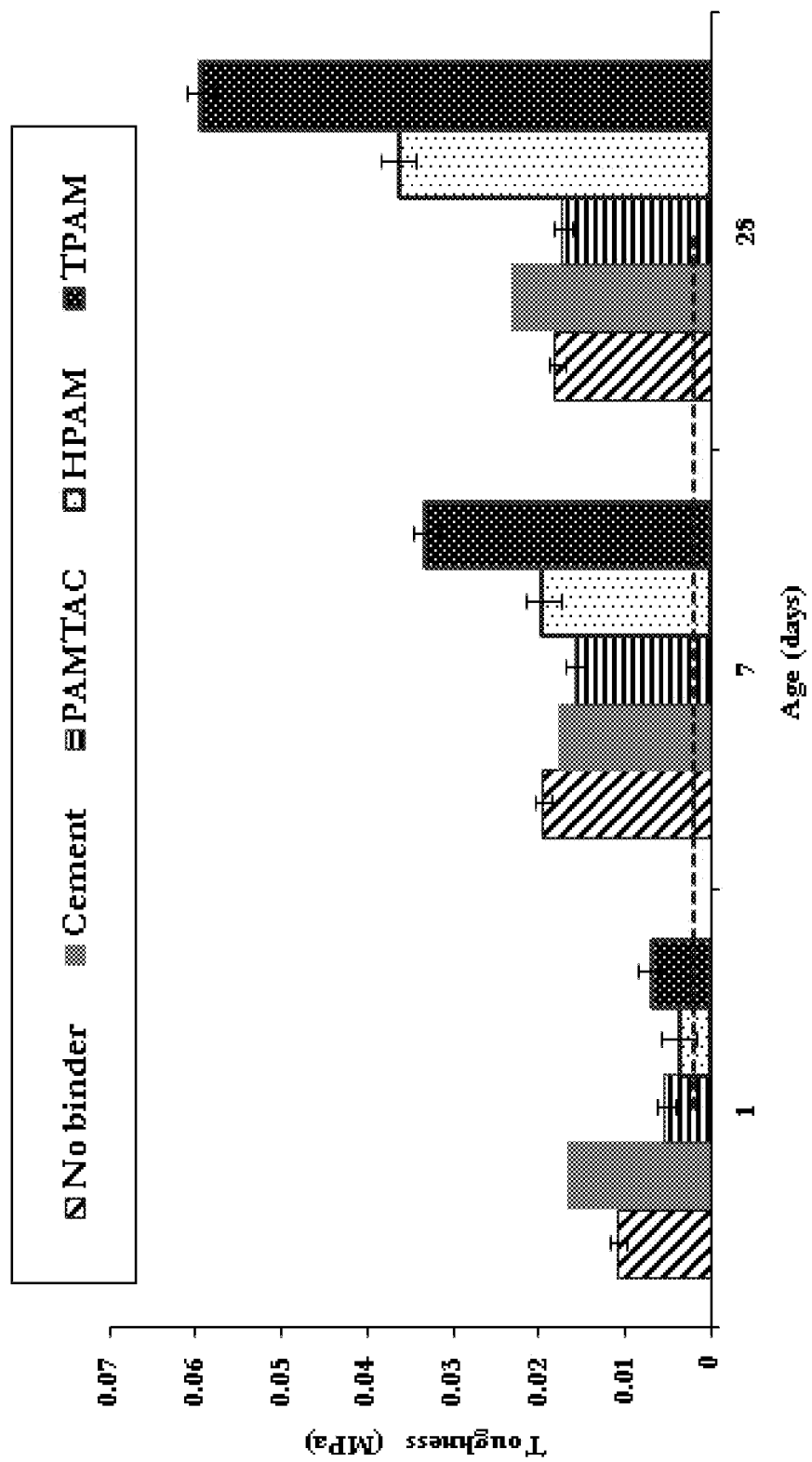
FIG. 6 shows the toughness of the soil and the soil treated with Portland Cement and different polymers after 1, 7 and 28 days of curing.

Overall, the polymer—proved suitable as a soil subgrade binder—is characterized by a particular ratio of the neutral, cationic and an anionic modules m. p and q, see FIG. 1.

Sample Preparation

The sample preparations and subsequent investigations followed procedure ASTM D 4609 (2008) [16]. The optimum moisture content and maximum dry density of the Qatar subgrade soil (with and without binder additions) was first determined following AASHTO T99 (2009) [17]. The moisture content was estimated in accordance to AASHTO T265 (2008) [18] using a drying oven controlled at 110±5° C. When treating the soil with PC, a pre-weighed quantity of cement, defined as grams per dry weight of soil, was dry mixed with the soil prior to the sequential addition of water. During soil treatment with polymers, a predetermined polymer content estimated as percentage per dry weight of soil was first dissolved in a known volume of water and then mixed with the soil.

Further small adjustments were applied to compensate for the contribution of the liquid polymer to the determined optimum moisture values. The treated soils were molded in accordance with AASHTO T99 (2009) [17] at their optimum moisture content and then three replicate cylindrical samples were extracted from each soil and immediately transferred to an oven and cured at 35° C.—a curing temperature that corresponds to an average temperature experienced in Qatar throughout the year. Three curing periods were selected, namely: one, seven and twenty eight days, respectively. Once cured, the samples were weighed and the dimensions measured using a digital Vernier caliper. Hence, the bulk densities of the cured samples followed.

Mechanical Testing

Unconfined Compressive Strength (UCS) and Elastic Modulus (E50)

The samples were tested for their unconfined compressive strengths using an MTS Insight electromechanical compression testing machine having a maximum load capacity of 250 kN and equipped with a linear variable differential transformer (LVDT) set up to measure the corresponding deformation/strains and the elastic modulus. The resilient modulus was not measured directly, but a value was determined empirically using models suggested by Barenberg (unpublished report, 1977), Thompson (1986) [19], and Little (personal communication, May 27, 2010) for design purposes from the UCS data: see Table 3. The sample testing was calibrated such that the moving head operated at approximately 1 mm/min (i.e. in accordance to ASTM D1633) [20]. Then, as noted, tests on a given sample were conducted in triplicate after sample curing of 1 day, 7 days and 28 days, respectively.

Energy and Toughness Estimation

As is well-known, the UCS is a convenient parameter for a comparative analysis of the effectiveness of a particular soil binder but it does not differentiate between brittle and ductile failure (Newman and Tingle 2004) [21]. Hence, the energy dissipated up to the point of failure was measured by recording the area under the corresponding stress-strain curve. The area up to the yield point gives an estimation of yield energy while the total area denotes the total energy absorbed. Toughness is a measure of the yield energy per unit volume (Newman and Tingle 2004) [21]. Here, Toughness and Total Energy are regarded as significant comparative indicators.

Pavement Structure

Figure 7:
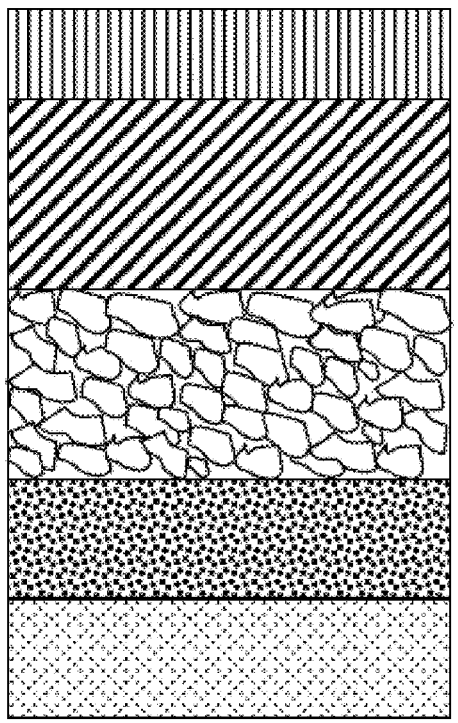
FIG. 7 shows pavement structure and layer thickness.
Figure 8:
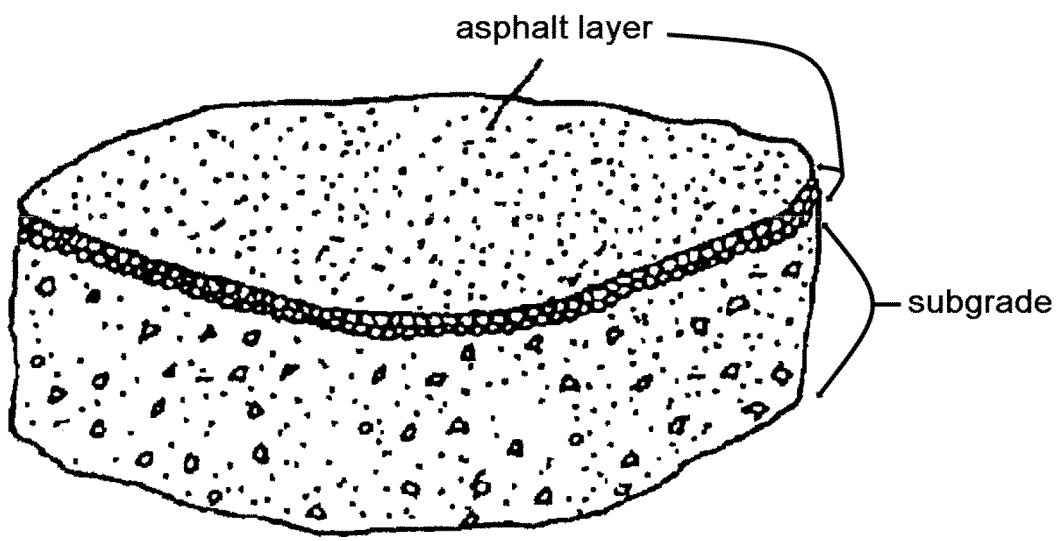
FIG. 8 shows an example of the current invention wherein an asphalt layer is deposited upon the cured and stabilized mixture of subgrade soil and polymers.

In one embodiment, the pavement structure used in this evaluation consists of five main layers: asphalt wearing course, asphalt base course, unbound granular base, stabilized subgrade, and natural subgrade as seen in FIG. 7, is it contemplated that the mixture of soil and polymers of the current invention would comprise the stabilized subgrade layer. A simplified example of one embodiment of the current invention is seen in FIG. 8. Table 1 shows the various material properties and thicknesses used in the analysis. The input parameters for the asphalt mixture were determined based on the gradations shown in Table 2, and an asphalt binder classified as PG 76-10 grade. The asphalt wearing course was selected to be 40 mm thick, while the base course was selected to be 250 mm thick. The asphalt binder grade was PG 76-10. The analysis was performed with these parameters as input data and with granular base layer thicknesses of 0 (i.e., no granular layer), 100 mm and 200 mm, respectively.

Thus, specific compositions and methods of co-polymer soil subgrade binders have been disclosed. It should be apparent, however, to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

REFERENCES

1. ASTM (American Society for Testing and Materials) Data Series. (2011) D2487-Standard Practice for Classification of Soils for Engineering Purposes (Unified Soil Classification System), *American Society for Testing and Materials West Conshohocken, Pa., USA.*
2. Tingle, J. S. and Santoni, R. L. (2003) Stabilization of clay soils with non-traditional additives, in *Proceedings of the Eighth International Conference on Low-Volume Roads,* pp 72-84, Transportation Research Board, Reno, Nev., USA.
3. Wallace, A. (1998) *Handbook of soil conditioners,* Marcel Dekker, New York, USA.
4. Heffer, A. W., Little, D. N., and Lytton, R. L. (2005) A synthesis of theories and mechanisms of bitumen-aggregate adhesion including recent advances in quantifying the effects of water, *Journal of the Association of Asphalt Paving Technology* 74, 139-195.
5. Hanley, H. J. M., Muzny, C. D., and Butler, B. D. (1997) Surfactant Adsorption on a Clay Mineral: Application of Radiation Scattering, *Langmuir* 13, 5276-5282.
6. Miller, W. P., Willis, R. L., and Levy, G. J. (1998) Aggregate stabilization in kaolinitic soils by low rates of anionic polyacrylamide, *Soil Use Management* 14(2), 101-105.
7. Liard, L. A. (1997) Bonding between polyacrylamide and clay mineral surfaces, *Soil Sci.* 162(11), 826-832.
8. Wallace, A., Wallace, G. A., and Cha, J. W. (1986) Mechanisms involved in soil conditioning by polymers, *Soil Sci.* 141(5), 381-386.
9. Seybold, C. (1994) Polyacrylamide review: soil conditioning and environmental fate, *Commun. Soil Sci. Plant Anal.* 25(11/12), 2171-2185.
10. Moustafa, A. B., Bazaraa, A. R., and Nour El Din, A. R. (1981) Soil stabilization by polymeric materials, *Macromol. Mater. Eng.* 97(1), 1-12.
11. Aly, S. M. and Miller, W. P. (1995) Evaluation of two polymers for soil stabilization and wind erosion control, *Egypt. J. Soil Sci.* 35(1), 71-83.
12. Rauch, A., F. et al. (2002) Measured effects of liquid soil stabilizers on engineering properties of clay, *Transportation Research Record* 1787, 33-41.
13. Iyengar, S. et al. (2012) Pavement Subgrade Stabilization Using Polymers: Characterization and Performance, *Journal of Materials in Civil Engineering* 0(E-published Aug. 25, 2012).
14. Matyjaszewski, K. (2001) Macromolecular engineering by controlled/living ionic and radical polymerizations, *Macromol. Symp.* 174(1), 51-68.
15. Patrizi, M. L. et al. (2009) Synthesis and association properties of thermoresponsive and permanently cationic charged block copolymers, *Polymer* 50(2), 467-474.
16. ASTM (American Society for Testing and Materials) Data Series. (2008) D4609-Standard guide for evaluating effectiveness of admixtures for soil stabilization, *American Society for Testing and Materials West Conshohocken, Pa. USA.*
17. AASHTO. (2009) T99—Moisture-density relations of soils, using a 5.5-lb (2.5-kg) rammer and a 12-in. (305-mm) drop [Method C], *American Association of State Highway and Transportation Officials Washington, D.C., USA.*
18. AASHTO. (2008) T265—Laboratory determination of moisture content of soils, *American Association of State Highway and Transportation Officials Washington, D.C., USA.*
19. Thompson, M. R. (1986) Mechanistic design concepts for stabilized base pavements, in *UILU-ENG-86-2008,* University of Illinois, Urbana, Ill., USA.
20. ASTM (American Society for Testing and Materials) Data Series. (2007) D1633—Standard test methods for compressive strength of molded soil-cement cylinders, *American Society for Testing and Materials West Conshohocken, Pa., USA.*
21. Newman, K. and Tingle, J. S. (2004) Emulsion polymers for soil stabilization soils, in 2004 *FAA Worldwide Airport Technology Transfer Conference,* Atlantic City, N.J., USA.

TABLE 1

Factors used in the analysis of the asphalt pavement performance

| Total asphalt Thickness (mm) | Asphalt Binder Grade | Unbound granular base Thickness (mm) | Natural Subgrade Modulus (MPa) | Stabilized Subgrade Thickness (mm) | Stabilized Subgrade Modulus (MPa) |
|---|---|---|---|---|---|
| 290 | PG 76-10 | 0, 100, 200 | 100 | 200 | 689, 2086 |

TABLE 2

Gradations of asphalt mixtures.

| | Sieve Size (in) | Sieve Size (mm) | Asphalt Mix Wearing | Base |
|---|---|---|---|---|
| Cumulative % Retained | ¾" | 19.00 | 0 | 5 |
| | ⅜" | 9.50 | 14 | 32 |
| | #4 | 4.75 | 39 | 55 |
| % Passing | #200 | 0.075 | 4 | 4 |

We claim:
1. A method of stabilizing a soil layer below asphalt-based pavements comprising;
   a) providing;
      i) a co-polymer soil subgrade binder of the formula:

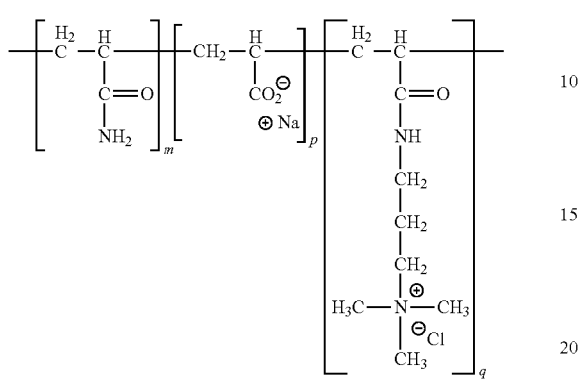

wherein the relative proportional range of m, p, and q are m is at least ⅓, p=0 to ⅔, q=0 to ⅔, and
   ii) soil; and
   b) treating said soil with said co-polymer soil subgrade binder so as integrate said binder with said soil to form a mixture, wherein the m, p, and q proportions of the co-polymer soil subgrade binder are varied within the range to suit the anionic/cationic/neutral composition of said soil.

2. A method of stabilizing a soil layer below asphalt-based pavements comprising;
   a) providing;
      i) a co-polymer soil subgrade binder of the formula:

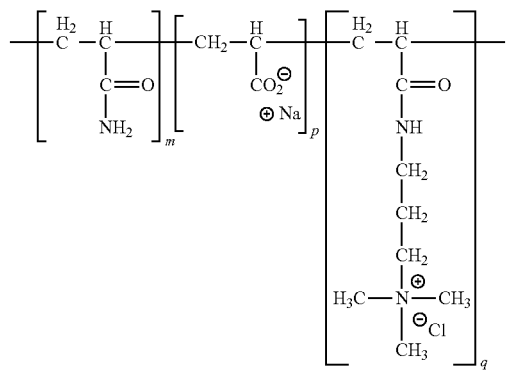

wherein the relative proportional range of m, p, and q are m is at least ⅓, p=0 to ⅔, q=0 to ⅔, and
   ii) soil; and
   b) treating said soil with said co-polymer soil subgrade binder so as integrate said binder with said soil to form a mixture, wherein said treating step comprises mixing said soil with an aqueous solution containing said co-polymer, wherein said co-polymer content per dry weight of soil is between 0.1 and 10 percent.

* * * * *